(12) United States Patent
Savory et al.

(10) Patent No.: US 7,266,310 B1
(45) Date of Patent: Sep. 4, 2007

(54) DIGITAL COMPENSATION FOR OPTICAL TRANSMISSION SYSTEM

(75) Inventors: Seb J Savory, Royston (GB); James Whiteaway, Sawbridgeworth (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 457 days.

(21) Appl. No.: 10/425,809

(22) Filed: Apr. 29, 2003

(51) Int. Cl.
H04B 10/148 (2006.01)

(52) U.S. Cl. ................................ 398/205; 398/207

(58) Field of Classification Search ......... 398/204–207
See application file for complete search history.

(56) References Cited

U.S. PATENT DOCUMENTS

| | | | |
|---|---|---|---|
| 5,003,626 A * | 3/1991 | Kuwahara et al. | 398/204 |
| 6,782,211 B1 * | 8/2004 | Core | 398/205 |
| 2002/0109885 A1 * | 8/2002 | Aburakawa et al. | 359/172 |
| 2004/0114939 A1 * | 6/2004 | Taylor | 398/152 |

OTHER PUBLICATIONS

Kazovsky, "Phase and Polraization Diversity Coherent Optical Techniques", Journal of Lightwave Technology, vol. 7, No. 2, Feb. 1989.*

Chikama, "Modulation and Demodulation Techniques in Optical . . . ", Journal of Lightwave Technology, vol. 8, No. 3, Mar. 1990, pp. 309-322.

"Optical QPSK Transmission System With Novel Digital Receiver Concept", Electronics Letters, vol. 27, No. 23, Nov. 7, 1991, pp. 2177-2179.

Derr, "Coherent Optical QPSK Intradyne System: Concept and Digital . . . ", Journal of Lightwave Technology, vol. 10, No. 9, Sep. 1992, pp. 1290-1296.

De Man, "A 60-MBaud Single-Chip QAM Processor for the complete . . . ", pp. 275-278.

Iwashita, "Chromatic Dispersion Compensation in Coherent Optical Communications", Journal of Lightwave Technology, vol. 8, No. 3, Mar. 1990, pp. 367-375.

Li, "Comparison of Coded and Uncoded QPSK Intradyne and . . . ", Journal of IEEE, 1993, pp. 1891-1895.

Shpantzer, "A New Generation of Coherent ULH Fiber-Optic Communication", 40 G Workshop OECC-2002 Conference, Japan, pp. 1-14.

Ono, "Polarization Control Method of Suppressing Polarization Mode . . . ", Journal of Lightwave Technology, vol. 12, No. 5, May 1994, pp. 891-898.

(Continued)

*Primary Examiner*—Leslie Pascal
(74) *Attorney, Agent, or Firm*—Barnes & Thornburg, LLP

(57) ABSTRACT

A receiver for an optical transmission system, has a polarization diverse and phase diverse coherent optical receiver, and a digital adaptive equalizer for compensating for distortions in the optical signal introduced by the optical path. The entire field of the optical signal is mapped including phase and polarization information, to enable more complete compensation for impairments such as chromatic dispersion and PMD. Furthermore, it can also reduce the problems which have so far held back coherent optical detection from widespread implementation, such as polarization alignment and phase tracking. This can be applied to upgrade existing installed transmission routes to increase capacity without the expense of replacing the old fiber.

15 Claims, 5 Drawing Sheets

OTHER PUBLICATIONS

Tseytlin, "Digital, endless polarization control for polarization . . . ", OFC 2003, pp. 1-14.
Sebald, "A Single Chip Adaptive QAM Processor for Data Rates . . . ", Radio Relay Systems, Oct. 11-14, 1993, pp. 227-233.
Shpantzer, "Coherent Optical Fiber Communication Architecture . . . ", SCEE 2002 Conference, Netherlands, pp. 1-39.
Sebald, "Advanced Time- and Frequency-Domain Adaptive . . . ", IEEE Journal on Selected Areas in Comm., vol. SAC-5, No. 3, Apr. 1987, pp. 448-456.

* cited by examiner

FIG 1. TRANSMISSION SYSTEM HAVING RECEIVER

FIG 2. BPSK RECEIVER

FIG 3. QPSK RECEIVER

FIG 4. BPSK RECEIVER USING MLSE

DIGITAL COMPENSATION FOR OPTICAL TRANSMISSION SYSTEM

FIELD OF THE INVENTION

This invention relates to receivers for optical transmission systems, to digital adaptive equalizers for such receivers, to software for such equalizers, and to methods of offering a transmission service over such apparatus.

BACKGROUND TO THE INVENTION

Known optical transmission systems can be broadly categorized as direct detection, or coherent detection systems. In direct detection systems, at the receiver, the signal power is measured and therefore any phase and polarization information in the optical signal is ignored and lost. In coherent detection systems, the phase and/or polarization information is detected which enables the use of polarization and/or phase modulation as well as amplitude modulation, and so much greater information carrying capacity is possible, than in direct detection systems for a given optical signal to noise ratio. Direct detection systems have nevertheless dominated the market for long haul transmission systems due to their simplicity. In contrast coherent receivers require careful polarization alignment and phase tracking, which is difficult and can limit the cost/performance trade off. In typical systems, the polarization may change at rates up to kHz levels, while phase variations can be typically up to MHz levels.

An example of a coherent system intended to be insensitive to polarization and phase fluctuations is shown in Cheng et al, Journal Lightwave Technology Vol 7, No 2, 1989. The incoming optical signal is split into two polarizations (e.g. vertical and horizontal polarizations using a Wollaston prism). Each of these two optical signals are then combined with a common optical local oscillator using an optical 90 degree hybrid to give in-phase and quadrature waveforms for the two polarization states. On detection using a photodiode this results in four electrical signals corresponding to the in-phase and quadrature waveforms for the two polarizations.

Both coherent and direct detection systems are also limited in high capacity systems by distortions introduced by the optical path, mostly optical fiber. There are many such distortions, including nonlinearities, four wave mixing, and so on, but the principal ones are usually chromatic dispersion (CD) and polarization mode dispersion (PMD). Chromatic dispersion is usually approximately fixed with respect to time, but may drift over the life of the fiber, or undergo step changes if the optical path is altered, for example by a protection switching operation, or switching in a wavelength routed network. PMD can vary over periods of minutes, and so needs adaptable control. Many complex solutions have been tried to compensate for PMD and CD with limited success. Solutions which correct the distortion in the optical domain involve expensive optical components.

An example of an electronic compensator for a conventional 10 Gb/s optical transmission system is described in a press release of Aug. 12, 2002 by Santel Networks, of Newark, Calif. They claim that it provides a single solution for mitigating impairments from PMD and CD, which may otherwise limit the reach of optical systems, impair quality-of-service levels or prevent deployment of service on legacy fiber. However, any such compensator will have a limited performance since in conventional direct detection systems, the optical field is not fully recovered, for example the phase and polarization information is lost.

SUMMARY OF THE INVENTION

It is an object of the present invention to provide improved apparatus and methods. According to a first aspect of the present invention, there is provided a receiver for an optical transmission system, having a polarization diverse and phase diverse coherent optical receiver, for receiving an optical input signal on an optical path and generating digital electrical outputs, and a digital adaptive equalizer coupled to the digital outputs, for compensating for distortions in the optical signal introduced by the optical path.

The use of such digital adaptive equalizing can be more efficient or more cost effective than optical domain methods of trying to compensate for impairments such as chromatic dispersion and PMD. Furthermore, it can also reduce the problems which have so far held back coherent optical detection from widespread implementation, such as polarization alignment and phase tracking associated with the local oscillator in the receiver. This could be commercially significant if it enables the upgrade of existing installed transmission routes to increase capacity without the huge expense of replacing the old, relatively poor quality fiber. The optical receiver need not necessarily generate digital outputs directly, it can be arranged in stages, separating the polarizations and phases in the optical domain, followed by conversion into the electrical domain, followed by analog to digital conversion. The term diverse is defined as meaning the output of the optical receiver retains all of the phase and polarization information in the input optical signal.

An additional feature of some embodiments is a bit error detector, the adaptive equalizer being arranged to minimize the bit error rate. This is one way of controlling the adaptation of the equalizer.

An additional feature of some embodiments is the optical receiver having four outputs, composed of the in-phase and quadrature waveforms on two polarizations. This is an optimal way of providing a complete mapping of the optical field of the optical input signal into the electrical domain. This retains information which is lost by receivers using direct detection of the optical signal.

An additional feature of some embodiments is the optical signal having two or more information channels modulated orthogonally, the adaptive equalizer being arranged to maximise the orthogonality of the information channels.

An additional feature of some embodiments is a correlator for determining the orthogonality.

An additional feature of some embodiments is the adaptive equalizer being a transversal filter. This is one of several possibilities. Transversal filters offer linear equalization and are well suited to compensating for chromatic dispersion, but are less suitable for compensating for non-linear transmission distortions. The tap weights on the transversal filters can be obtained by passing training data through the system, but there are other possibilities such as direct calculation if the system transmission characteristics are sufficiently understood.

An additional feature of some embodiments is the transversal filter being adapted by iteration of a limited set of independent variables including three defining the orientation and magnitude of PMD, and one each for the chromatic dispersion, the orientation of the polarizing element at the receiver, and the phase of a local oscillator used for phase diverse detection in the optical receiver. Minimising the number of independent variables, to be fewer than the number of taps in the transversal filters, can increase the chances of successful and sufficiently rapid convergence on a true global minimum.

An additional feature of some embodiments is the adaptive equalizer being a maximum likelihood sequence estimator (MLSE) or a maximum a posteriori (MAP) detector. These alternatives to the transversal filter have the advantage of being non-linear and so can take into account non additive effects more readily. The MLSE and MAP equalizers require training, as do transversal filters, in order to set up the algorithms required for the signal processing.

An additional feature of some embodiments is the adaptive equalizer being arranged to have an update rate of at least 1 kHz which is suitable for adaptation to PMD.

An additional feature of some embodiments is the adaptive equalizer having fractional spacing corresponding to sampling at an integer multiple of the bit rate. This can improve performance, but at the cost of requiring higher speed electronics.

An additional feature of some embodiments is the optical receiver having a polarization beam splitter feeding a pair of 90° optical hybrids, and convertors for converting outputs of the optical hybrids into digital electrical signals.

An additional feature of some embodiments is the optical input signal being quadrature amplitude modulated, the adaptive equalizer having one or more in phase and quadrature outputs for each polarization.

An additional feature of some embodiments is the optical input signal being modulated by any of phase, amplitude, frequency, and polarization, the adaptive equalizer being arranged to output demodulated signals. It is efficient to have the equalizer output such signals rather than intermediate signals which need further processing.

Another aspect provides a digital adaptive equalizer for the receiver.

Another aspect provides software for implementing the equalizer. This acknowledges that software can be a valuable, separately tradable commodity. It is intended to encompass software, which runs on or controls "dumb" or standard hardware, to carry out the desired functions, (and therefore the software essentially defines the functions of the equalizer, and can therefore be termed an equalizer, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect provides a method of offering a data transmission service over the network. The advantages of the invention can enable improvements to be made in the system or network performance such as being more reliable or more flexible, having a greater capacity, or being more cost effective. Consequently data transmission services over the network can be enhanced, and the value of such services can increase. Such increased value over the life of the system, could prove far greater than the sales value of the equipment.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Adaptive equalization is a technique known for compensating for channel distorting effects in transmission systems, using digital filters, e.g. transversal filters, maximum likelihood sequence estimators, or maximum a posteriori detectors. What is notable is the application of this with a coherent optical detector to compensate for optical distortions. Embodiments of the invention use coherent detection of an incoming optical signal to map the optical field into four electrical signals. A subsequent digital adaptive equalizer can use these signals, containing phase and polarization information, for compensation of effects such as polarization mode dispersion (PMD) and chromatic dispersion which otherwise cause an increase in the bit error rate.

Figure 1:
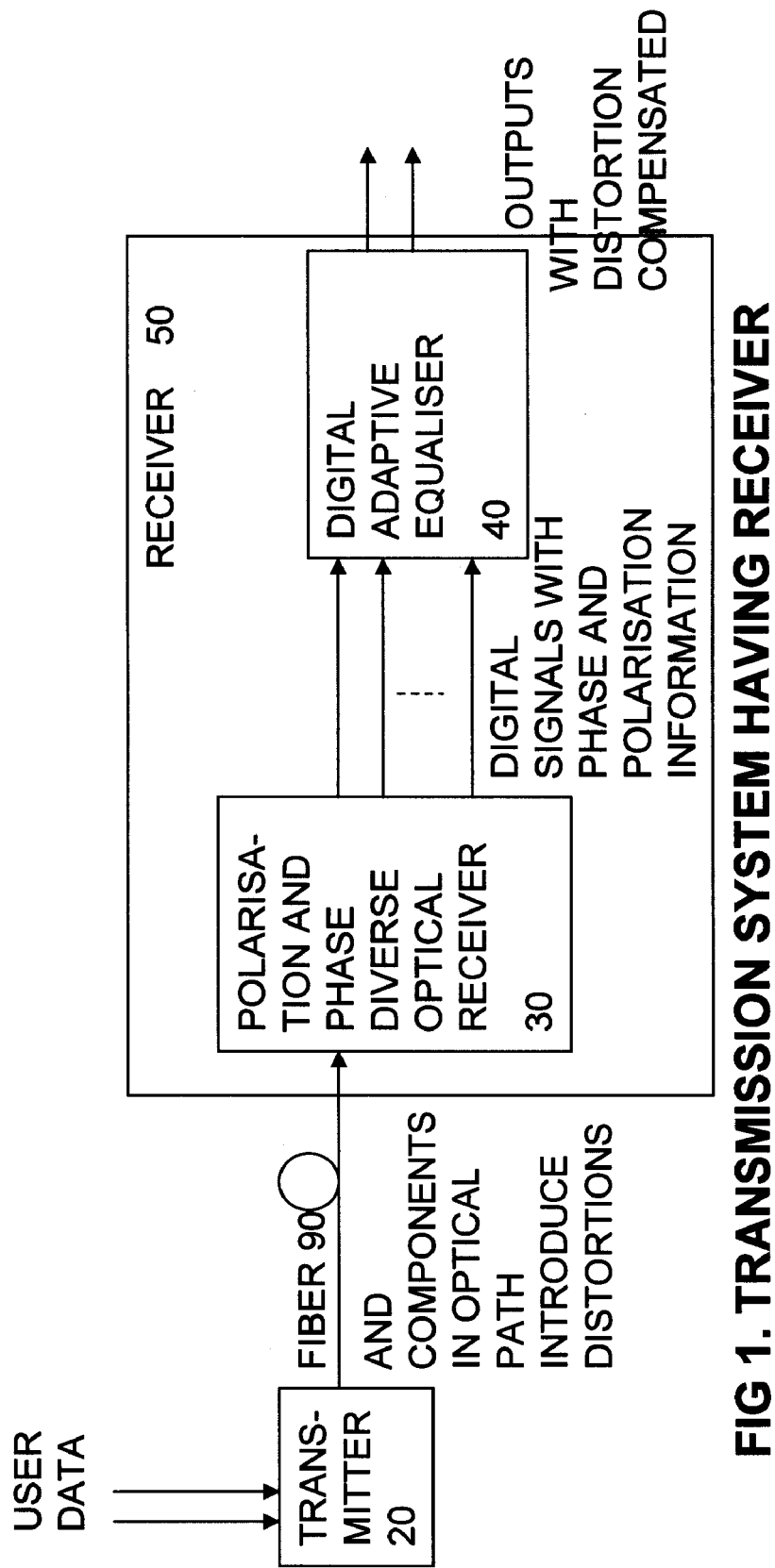
FIG. 1 shows a transmission system having a receiver according to an embodiment of the invention.

FIG. 1 shows an optical transmission system using an embodiment of the invention. A transmitter 20 is shown for modulating user data onto an optical signal. This is fed along an optical path including a fiber 90, typically many kilometers or hundreds of kilometers long. The signal may be on a single wavelength and be wavelength division multiplexed with many other signals. There may be many components in the optical path, including optical amplifiers, optical compensators, wavelength multiplexers and demultiplexers and so on. These will all introduce the distortions mentioned above. At the receiver 50, a polarization and phase diverse optical receiver 30 takes the optical signal and produces a digital output signal or signals in the electrical domain ready for digital processing. Being a polarization and phase diverse receiver, its outputs have not lost the phase and polarization information inherent in the optical signal. There are various ways to implement such an optical receiver. A digital adaptive equalizer 40 makes use of this phase and polarization information to compensate for the optical distortions. The equalizer can also complete the demodulation of the original user data channels. In principle the user data can be modulated by any of phase, amplitude, frequency, and polarization. In practice, the more common modulation types include IM/DD (Intensity Modulation/Direct Detection), BPSK (Binary Phase Shift Keying), QPSK (Quadrature Phase Shift Keying), QAM (Quadrature Amplitude Modulation), FSK (Frequency Shift Keying), multilevel FSK, Polarization Shift Keying, and combinations of these. The optical receiver can be arranged to effectively optically resolve the waveform into components with orthogonal phase and polarization, but resolution into the components corresponding to the transmitted channels, and/or demodulation of further levels of coding in the phase/polarization/amplitude/frequency space are better carried out after or simultaneously with the equalization to compensate for the optical distortions. Otherwise the loss of orthogonality from these distortions will cause cross talk between the channels, resulting in increased bit error rates. Equalization can be implemented by for example linear equalizers, decision-feedback equalizers, and maximum-likelihood sequence-estimation (MLSE) equalizers. A linear equalizer tries to undo the linear distortions of the channel by filtering the received signal. A decision-feedback equalizer exploits previous symbol detections to cancel out the intersymbol interference from echoes of these previous symbols. Finally, an MLSE equalizer hypothesizes various transmitted symbol sequences and, with a model of the dispersive channel, determines which hypothesis best fits the received data. These equalization techniques are well known to those skilled in the art, and can be found in standard textbooks such as J. G. Proakis, Digital Communications, 2nd ed., New York: McGraw-Hill, 1989.

Figure 2:
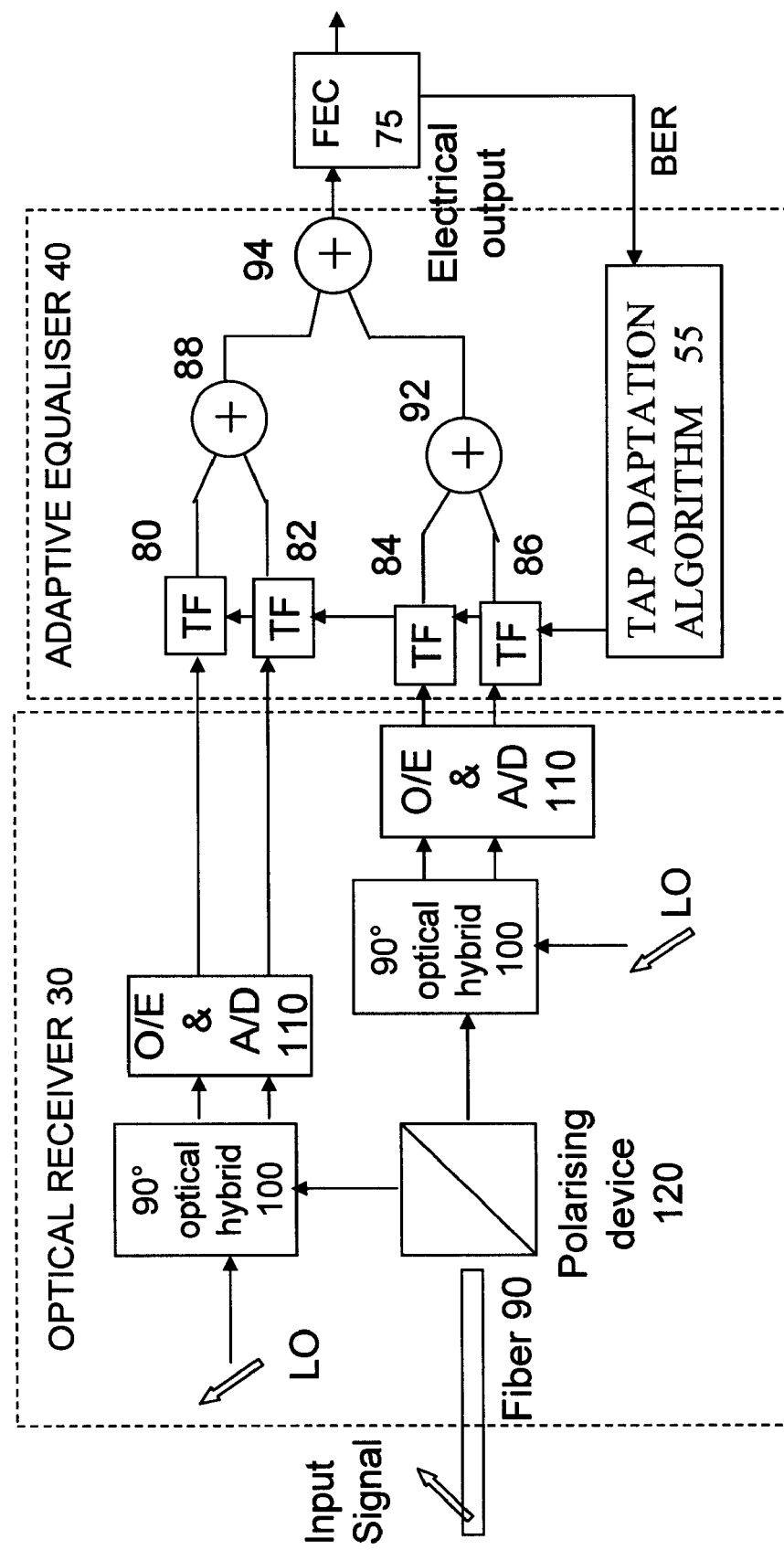
FIG. 2 shows a BPSK receiver

FIG. 2 shows a BPSK receiver. This embodiment can be used in the system of FIG. 1 or in other systems. The optical receiver 30 includes a polarizing device 120 for receiving the optical signal from fiber 90. This is for separating the incoming signal into orthogonal polarizations, e.g. horizontal and vertical. It can be implemented by a polarization beam splitter, or other components which have two or more outputs with different polarization transmission coefficients. The separate polarizations from a polarization beam splitter are fed to a pair of 90° optical hybrids 100 for mixing with a local oscillator laser source. The outputs are the two mixing products with orthogonal phases between the optical signal and the local oscillator. The generation of the two mixing products has to be performed in the optical domain to preserve the phase information. However the local oscillator can be closely locked in phase to the incoming signal for homodyne detection, or be separated from the local oscillator by several times the signal bandwidth in the frequency domain for heterodyne detection. The latter option then requires further mixing in the electrical domain to down convert to base band. There is also an intermediate option known as intradyne detection where the incoming signal and local oscillator are spaced apart in the frequency domain by a fraction of the signal bandwidth, which again requires mixing in the electrical domain.

It is not essential that there are four outputs of the optical receiver, nor that the outputs are orthogonal. Other ways of retaining the phase and polarization information are conceivable. For example six outputs can be produced, with 120° relative phase or polarization difference rather than four outputs with 90°.

The outputs of the optical hybrids are fed to convertors 110 if necessary, to convert into the electrical domain and from analog electrical signals into digital electrical signals. The digital signals are fed to the digital adaptive equalizer 40. This includes equalizers which could for example be transversal filters 80, 82, 84, 86, for each of the four orthogonal signals. Transversal filters are one way of implementing a digital adaptive equalizer in the form of an FIR (Finite Impulse Response) filter with variable coefficients time-spaced by an amount equal to the signal sample interval which is typically the symbol time or an integral sub-multiple thereof. The tap weights for such filters can be determined and adapted by calculation from training sequences, and updated by iteration for example, to minimize the bit error rate. A tap adaptation algorithm 55 can be implemented in various ways. It can use iteration techniques, and/or use pre calculation of taps based on known or predicted values of CD for example. The equalizers do not have to be FIR transversal filters, but could also be maximum likelihood sequence estimators, maximum a posteriori detectors, IIR (Infinite Impulse Response) transversal filters, decision feedback equalizers or a combination thereof.

The outputs of the transversal filters are summed by adders 88, 92 and 94, to produce a signal representing the user data. Optionally this may include FEC (forward error correction) codes to enable the bit error rate to be reduced from that of the raw data A FEC element 75 uses these codes to detect bit errors and carry out the corrections. This element can therefore output an indication of a bit error rate (BER) which can be used to adapt the adaptive equalizer. This is achieved by using the BER as an input to the tap adaptation algorithm.

One practical issue is the update time for the adaptive filters. Given that the rate of polarization evolution in a fiber is of the order of kHz, the refresh rate should be greater than this to enable such changes to be tracked. This is a realisable update rate for the adaptive filter in a transmission system operating at channel data rates of gigabits per second. The update rate is usually limited by the computational resource available, the complexity of the adaptation algorithm, the number of taps to be calculated, the range of dispersion to be compensated, and so on. The choice of the number of taps will determine the amount of chromatic dispersion that can be compensated. When chromatic dispersion is being compensated the filter is only modifying the phase response and not the amplitude response. This means that the filter has an all pass response and the noise magnification is the sum of the squared tap weights which is unity. Hence the noise level is not affected by a filter that compensates only for chromatic dispersion. In the more general case, if a non-linear filter function is implemented, which would not be possible using a transversal filter, then the noise might be amplified by the equalizer.

Tap Adaptation Algorithm

There are many possible algorithms known for adapting taps to minimize an error signal fed back from the output of the filter. In principle, the algorithm can be based on the iteration of the tap weights using a general mathematical minimization routine which does not take any account of the physical reality of the situation. Alternatively it can be a direct non iterative calculation derived from, for example, measurements of actual CD or PMD. One example is the compensation of pure chromatic dispersion, which introduces a quadratic phase variation with frequency corresponding to a linear variation in group delay with frequency. The quadratic phase response in the frequency domain can be transformed into an equivalent temporal response using an FFT (Fast Fourier Transform). The temporal response is then windowed and used to set the tap weights so as to obtain the desired finite impulse response.

There is a linear relationship between the no. of taps required, for a given OSNR (Optical Signal to Noise Ratio) penalty, and the chromatic dispersion for both iterated and calculated tap weights. In one example using iterated tap weights in a BPSK system, 29 taps gave 18,000 ps/nm of dispersion compensation (1000 km NDSF) for a 1 dB OSNR penalty at $10^{-3}$ BER. In another arrangement using tap weights calculated from the chromatic dispersion using an FFT (Fast Fourier Transform), 65 taps gave 34,800 ps/nm of dispersion (2000 km NDSF) for a 1 dB OSNR penalty at $10^{-3}$ BER.

Where an iterative process is used, each of the taps is usually regarded as an independent variable in the algorithm. If there are too many taps, the algorithm may be too slow, or may not converge on a true global minimum. An alternative is to determine the taps indirectly. The algorithm determines, or is fed with other independent variables and calculates the taps from the values of those independent variables. The number of these independent variables can be minimized by, for example, selecting the following as independent variables:

1, 2: angles used to describe the orientation of one fiber PMD principal state on the Poincaré sphere.
3: magnitude of PMD.
4: chromatic dispersion.
5: orientation of the polarization beam splitter (PBS) relative to fiber.
6: phase of local oscillator LO.

Fractionally Spaced Equalizer (FSE)

Improved performance may be obtained using fractionally spaced equalizers (FSE) consisting of say an adaptive FIR filter with taps time-spaced by an amount equal to the digital sampling interval which would be an integral submultiple of the symbol time. An example is shown in U.S. Pat. No. 6,240,134. As it is a well known and well documented technique, it need not be described here in more detail. Performance of a fractionally spaced equalizer with a sufficient number of taps is less dependent on phase characteristics of the transmission channel and on how well the phase is recovered by the optical receiver.

Figure 3:
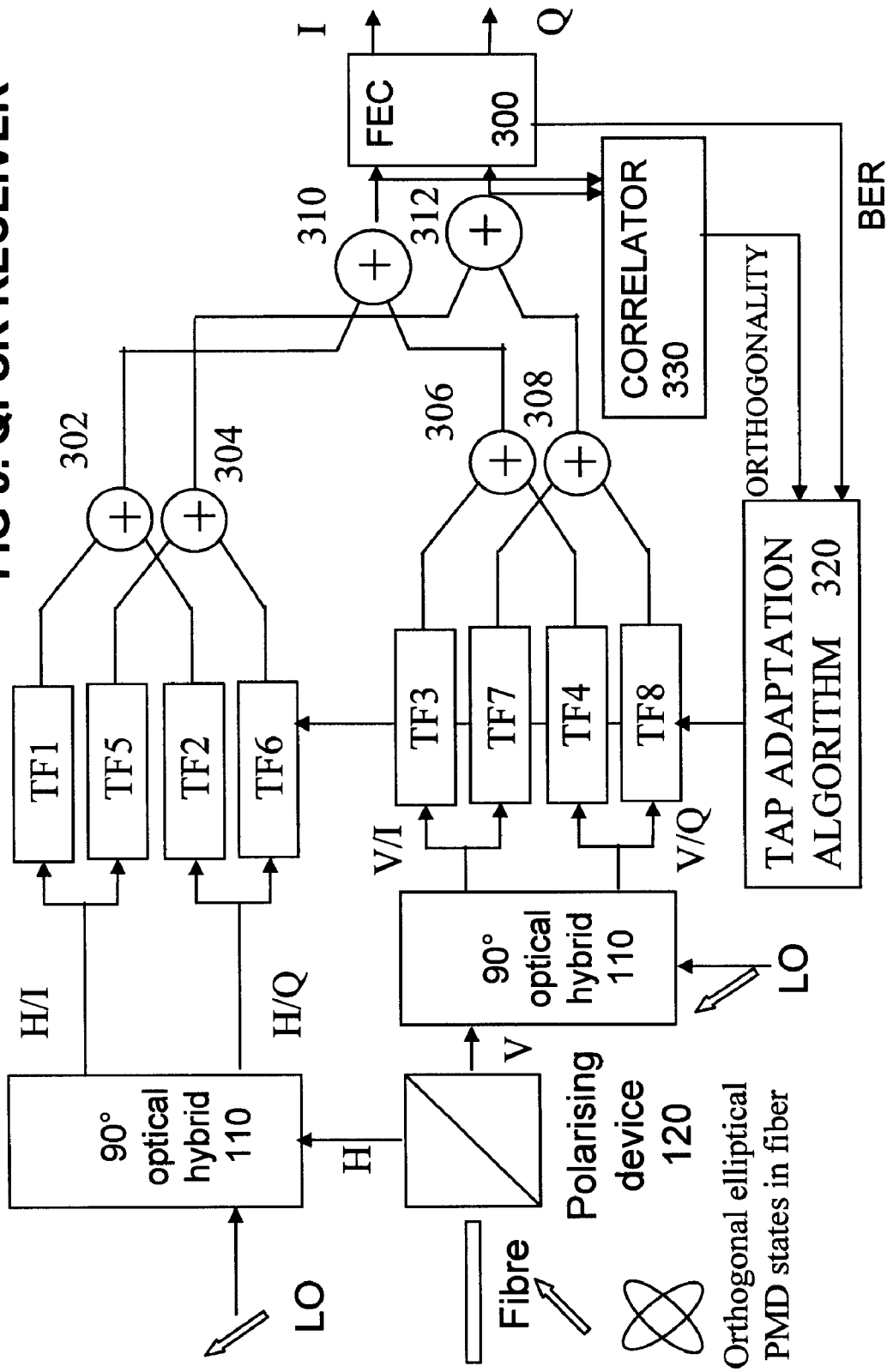
FIG. 3 shows a QPSK receiver.

FIG. 3 Shows a QPSK Receiver

The reference numerals used in this figure correspond to those used above where appropriate. In this case, instead of four transversal filters there are eight, labeled TF1 to TF8. There are two channels of user data, modulated on orthogonal polarizations.

In general orthogonal elliptical states are transmitted and in the presence of first order PMD they rotate around the Poincaré sphere, while maintaining their orthogonality, as the waveforms propagate along the fibre. In addition chromatic dispersion applies equally to both polarization states. At the receiver the objective is to separate out the orthogonal elliptical states, by taking the outputs from the arbitrarily orientated polarization beam splitter and summing them with an appropriate phase difference so as to select one of the orthogonal states. The other elliptical state is selected using a different phase difference so as to address the orthogonal elliptical polarization. Superimposed on this is the need to compensate for chromatic dispersion.

To remove these distortions, the 4 outputs from the optical hybrids 110 are coupled via convertors (not illustrated) to each feed digital inputs to two of the transversal filters. The four outputs are a horizontal polarization in phase signal H/I, a horizontal polarization quadrature phase signal H/Q, a vertical polarization in phase signal, V/I, and a vertical polarization quadrature phase signal, V/Q.

Calculation of tap weights for filters TF1–4 can be carried out using the same algorithm as set out above in relation to FIG. 2. The orthogonality of QPSK channels allows calculation of tap weights for filters TF5–8, as follows: TF5=−TF2, TF6=+TF1, TF7=−TF4, TF8=+TF3. Adders 302, 304, 306, 308, 310 and 312 are provided to sum the outputs of the transversal filters to reproduce two orthogonal compensated output channels, an in phase channel and a quadrature channel. The in phase channel is produced by summing outputs from filters TF1–TF4, fed by all four outputs of the optical receiver. The quadrature channel is produced by summing the outputs of filters TF5–TF8, again fed by all four outputs of the optical receiver.

If large numbers of taps are used, it may be impractical to iterate all the taps in the 8 transversal filters to obtain an exact equalization of a QPSK signal for chromatic dispersion and PMD, because the multi-dimensional space being searched can exhibit local minima that can lead to solutions for the tap weights that do not correspond to the global minimum. In other words there may be problems with convergence onto the global optimum in the equalization space. Nevertheless if the iteration is carried out over the 6 independent variables mentioned above, from which all the tap weights can be calculated, irrespective of the magnitude of the two dispersions, then at least an approximate solution can be obtained. The option remains to perform a more detailed iteration of the tap weights using the approximate solution as a starting point.

The feedback to the adaptation algorithm can for example be either BER or a measure of orthogonality of the channels, or both. The orthogonality of the channels can be determined by a correlator 330. This can be implemented using conventional digital techniques.

Figure 4:
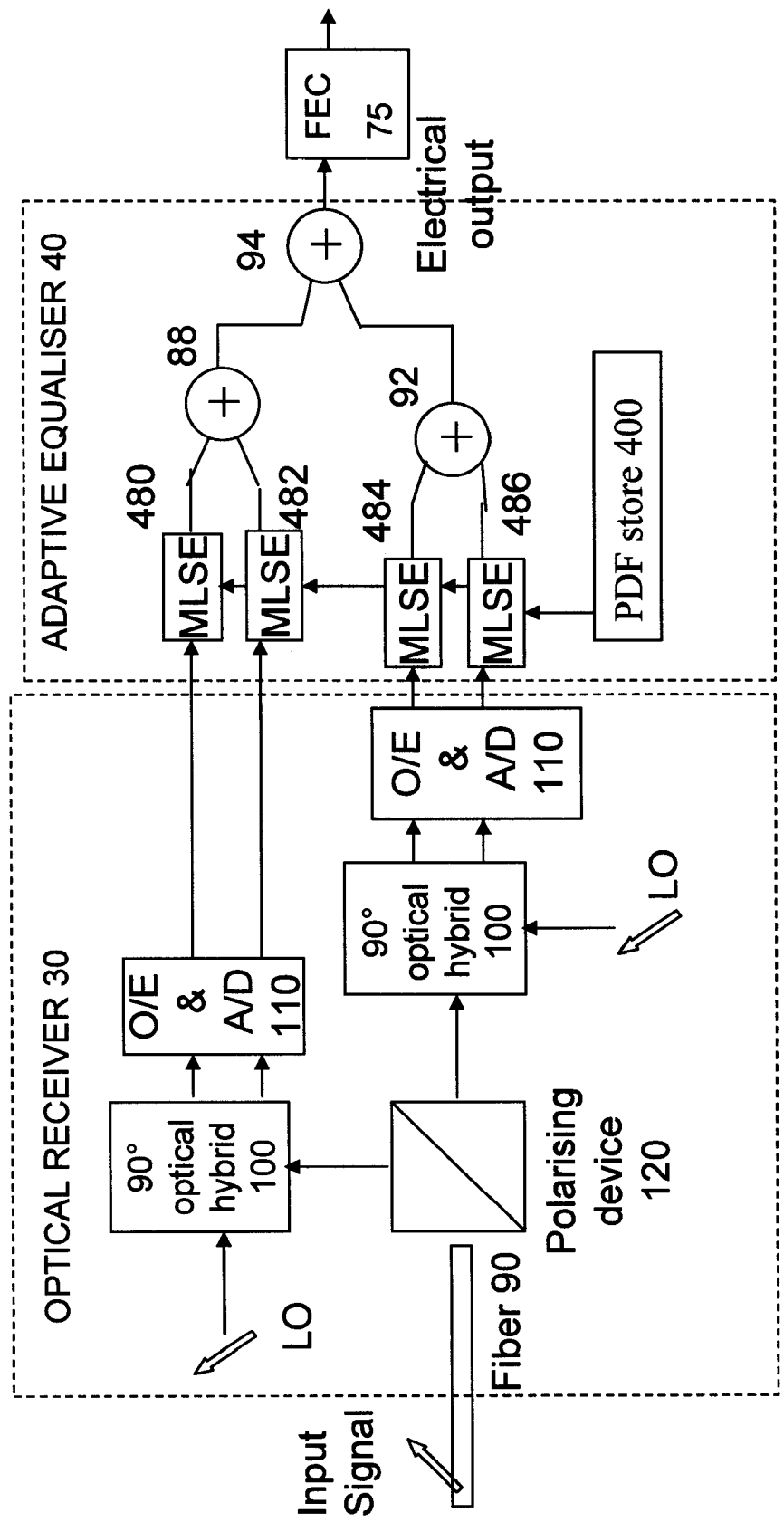
FIG. 4 shows a receiver using MLSEs.
Figure 5:
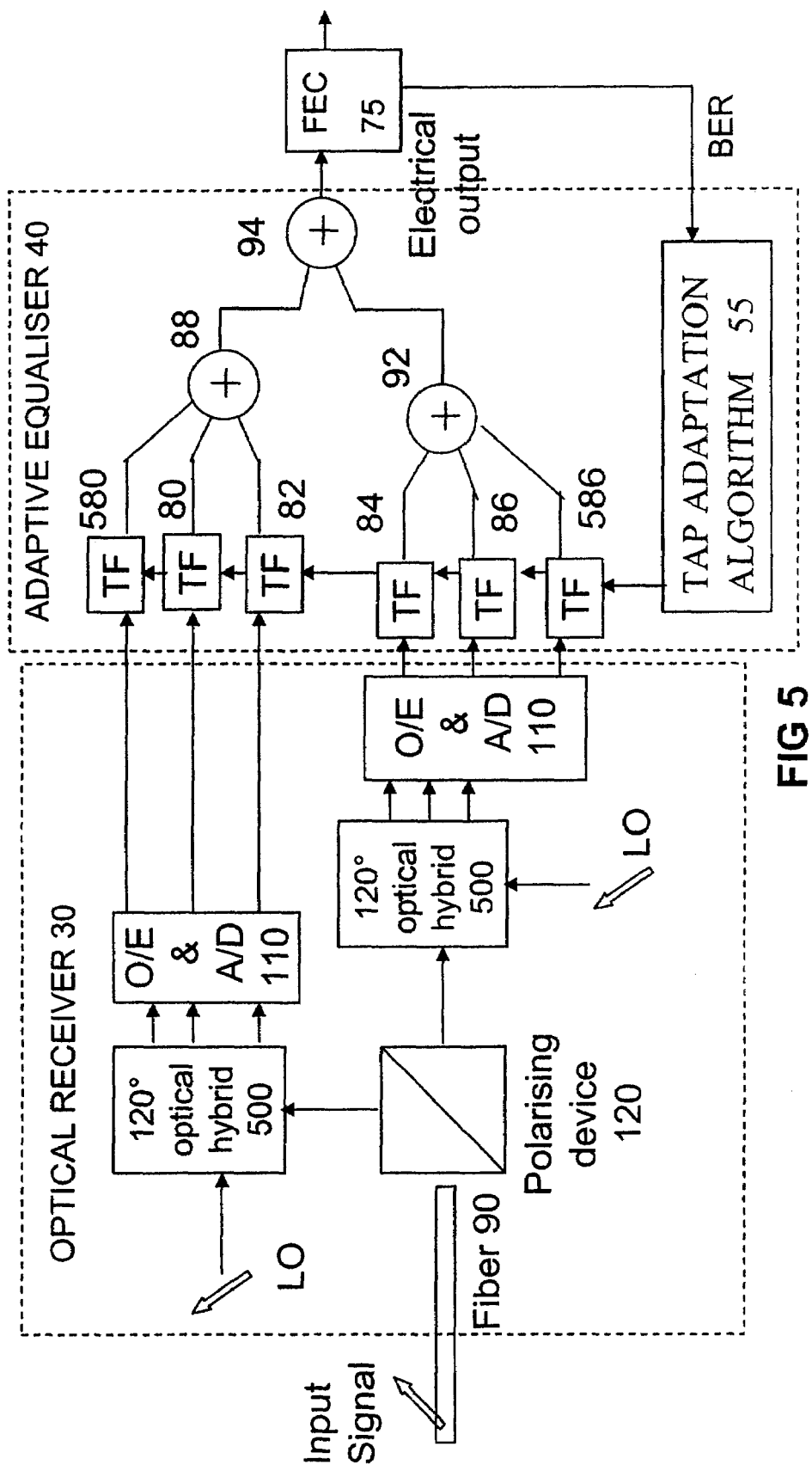
FIG. 5 shows a further receiver using MLSEs.

FIG. 4 shows a BPSK receiver using an MLSE equalizer to implement the adaptive equalization. Corresponding reference numerals to those of FIG. 2 have been used as appropriate. In place of the transversal filters, MLSE functions 480, 482, 484, 486 are provided for processing the digital signals. In an MLSE equalizer, all possible transmitted symbol sequences up to a certain length are considered. For each hypothetical sequence, the received signal samples are predicted using a model of the distortions in the channel. The difference between the predicted received signal samples and the actual received signal samples, referred to as the prediction error, gives an indication of how good a particular hypothesis is. The squared magnitude of the prediction error is used as a metric to evaluate a particular hypothesis. This metric is accumulated for different hypotheses, to give probability density functions (PDF), stored in pdf store 400, for use in determining which hypothesis is best. This process can be realized in various ways, and the Viterbi algorithm, which is a form of dynamic programming is an efficient example.

The PDFs can be adapted by a training process, using feedback from sources such as BER and correlation, (not shown in the figure) or more effectively, by using known training input sequences. The PDFs therefore effectively store an indirect representation or model of the distortions being compensated.

CONCLUDING REMARKS

As has been described above, a receiver for an optical transmission system, has a polarization diverse and phase diverse coherent optical receiver, and a digital adaptive equalizer for compensating for distortions in the optical signal introduced by the optical path. The entire field of the optical signal is mapped including phase and polarization information, to enable more complete compensation for impairments such as chromatic dispersion and PMD. Furthermore, it can also reduce the problems which have so far held back coherent optical detection from widespread implementation, such as polarization alignment and phase tracking associated with the local oscillator in the receiver. This technique can be applied to upgrade existing installed transmission routes to increase capacity without the expense of replacing the old fiber.

Other variations will be apparent to those skilled in then art, having corresponding advantages to those set out above, within the scope of the claims.

The invention claimed is:

1. A receiver for an optical transmission system, having a polarization diverse and phase diverse coherent optical receiver, for receiving an optical input signal on an optical path and generating digital electrical outputs, a digital adaptive equalizer coupled to the digital outputs, for compensating for distortions in the optical signal introduced by the optical path, in which the optical receiver has four outputs, in-phase and quadrature on two polarizations, and the optical signal has two or more information channels modulated orthogonally, the adaptive equalizer being arranged to maximise an orthogonality of information channels.

2. The receiver of claim 1, having a bit error detector, the adaptive equalizer being arranged to minimize a bit error rate.

3. A receiver according to claim 1 having six outputs, three on each polarization state.

4. A receiver according to claim 3 wherein the three outputs on each polarization have 120° relative phase or polarization difference.

5. The receiver of claim 1, having a correlator for determining the orthogonality.

6. The receiver of claim 1, the adaptive equalizer being a transversal filter.

7. The receiver of claim 6, the transversal filter being adapted by iteration of a limited set of independent variables including three defining the orientation and magnitude of PMD, and one each for the chromatic dispersion, the orientation of polarizing element at the receiver, and the phase of a local oscillator used for phase diverse detection in the optical receiver.

8. The receiver of claim 1, the adaptive equalizer being one of a maximum likelihood sequence estimator and a maximum a posteriori detector.

9. The receiver of claim 1, the adaptive equalizer being arranged to have an update rate of at least 1 kHz.

10. The receiver of claim 1, the adaptive equalizer having fractional spacing.

11. The receiver of claim 1, the optical receiver having a polarization beam splitter feeding a pair of 90° optical hybrids, and convertors for converting outputs of the optical hybrids into digital electrical signals.

12. The receiver of claim 1, the optical input signal being quadrature amplitude modulated, the adaptive equalizer having one or more in phase and quadrature outputs for each polarization.

13. The receiver of claim 1, the optical input signal being modulated by any of phase, amplitude, frequency, and polarization, the adaptive equalizer being arranged to output demodulated signals.

14. A method of offering a data transmission service over the receiver of claim 1.

15. A receiver for an optical transmission system, having
a polarization diverse and phase diverse coherent optical receiver, for receiving an optical input signal on an optical path and generating digital electrical outputs,
a digital adaptive equalizer coupled to the digital outputs, for compensating for distortions in the optical signal introduced by the optical path, the adaptive equalizer being a transversal filter, and
the transversal filter being adapted by iteration of a limited set of independent variables including three defining the orientation and magnitude of PMD, and one each for the chromatic dispersion, the orientation of polarizing element at the receiver, and the phase of a local oscillator used for phase diverse detection in the optical receiver.

* * * * *